United States Patent [19]

Holmström et al.

[11] Patent Number: 4,678,654

[45] Date of Patent: * Jul. 7, 1987

[54] PROCESS FOR PRODUCTION OF CHLORINE DIOXIDE

[75] Inventors: Ulla-Kari M. Holmström, Sundsvall; Lage M. Sandgren, Kvissleby; Maria G. Norell, Sundsvall; Peter A. Axegård, Solna, all of Sweden

[73] Assignee: KemaNord AB, Stockholm, Sweden

[*] Notice: The portion of the term of this patent subsequent to Jul. 7, 2004 has been disclaimed.

[21] Appl. No.: 726,327

[22] Filed: Apr. 23, 1985

[30] Foreign Application Priority Data

Mar. 4, 1985 [SE] Sweden ................ 8501046

[51] Int. Cl.$^4$ .......... C01B 7/01; C01B 11/02; C01B 17/74
[52] U.S. Cl. ................ 423/478; 423/486; 423/529; 423/531
[58] Field of Search ........... 423/478, 486, 522, 529, 423/531; 210/754

[56] References Cited

U.S. PATENT DOCUMENTS

| | | | |
|---|---|---|---|
| 3,714,040 | 1/1973 | Jordan et al. | 423/486 |
| 3,864,456 | 2/1975 | Winfield et al. | 423/478 |
| 4,086,329 | 4/1978 | Cowley et al. | 423/478 |
| 4,393,035 | 7/1983 | Fredette | 423/486 |
| 4,393,036 | 7/1983 | Fredette | 423/486 |
| 4,508,593 | 4/1985 | Bergstrom | 423/486 |

Primary Examiner—John Doll
Assistant Examiner—Jeffrey Edwin Russell
Attorney, Agent, or Firm—Fred Philpitt

[57] ABSTRACT

A mixture of sulfuric acid and hydrochloric acid essentially free from dissolved sulfur dioxide to be used in a chlorine dioxide reactor is produced by reacting chlorine and sulfur dioxide in at least two reaction zones. In the bottom of a primary reaction zone the total amount of sulfur dioxide needed for the mixed acid production is introduced in an aqueous mixture of sulfuric and hydrochloric acid containing dissolved chlorine and gaseous chlorine. The sulfur dioxide reacts with chlorine in the aqueous phase to produce sulfuric acid and hydrochloric acid. The mixed acid produced in the primary reaction zone contains dissolved quantities of sulfur dioxide and is forwarded to a secondary reaction zone. Chlorine is introduced into the lower part of the secondary reaction zone. The amount introduced can be the total amount of chlorine to be used in the production of the mixed acid for the chlorine dioxide reactor, or it can be a part of that amount, the balance being introduced in the primary reaction zone. The amount should be large enough for a gaseous chlorine phase to leave the secondary reaction zone. The produced mixed acid is withdrawn from the lower part, and preferably the bottom of the secondary reaction zone. At least a part of the mixed acid is introduced into a chlorine dioxide reactor.

10 Claims, 2 Drawing Figures

PROCESS FOR PRODUCTION OF CHLORINE DIOXIDE

TECHNICAL FIELD

The present invention relates to a process preparing chlorine dioxide by reaction of a chlorate, a chloride and a mineral acid. More specifically the invention relates to the production of mixed mineral acid to be used in the process.

BACKGROUND ART OF THE INVENTION

Chlorine dioxide used as an aqueous solution is of considerable commercial interest and importance, mainly in the area of pulp bleaching but also in water purification, fat bleaching, removal of phenols from industrial wastes, etc. It is therefore desirable to provide processes by which the chlorine dioxide can be efficiently produced.

The predominant chemical reaction involved in such processes is summarized by the formula $$ClO_3^- + Cl^- + 2H^+ \rightarrow ClO_2 + \tfrac{1}{2}Cl_2 + H_2O \tag{1}$$

The chlorate ions are provided by alkali metal chlorate, preferably sodium chlorate, the chloride ions by alkali metal chloride, preferably sodium chloride, or by hydrogen chloride, and the hydrogen ions by mineral acids, normally sulfuric acid and/or hydrochloric acid.

There are also competing reactions which decrease the efficiency of the formation of chlorine dioxide from chlorate ions, the main reaction being represented by the formula $$ClO_3^- + 6H^+ + 5Cl^- \rightarrow 3Cl_2 + 3H_2O \tag{2}$$

The efficiency of commercial processes, such as the SVP process (SVP is a registered Trade Mark owned by KemaNord, Sweden) are normally above 90% and preferably above 95%, which means that the competing reaction represented by formula (2) is very much suppressed.

Processes for producing chlorine dioxide are set forth in e.g. U.S. Pat. No. 3,563,702 and 3,864,456, which are hereby incorporated by reference, comprising continuously feeding to a single vessel generator-evaporator-crystallizer alkali metal chlorate, an alkali metal chloride and mineral acid solutions in proportions sufficient to generate chlorine dioxide and chlorine, at a temperature of from about 50 to about 100 degrees centigrade, and an acidity of from about 2 to about 12 normal, with or without a catalyst, removing water by vacuum-induced evaporation at about 100–400 millimeters of mercury absolute, with concurrent withdrawal of chlorine dioxide and chlorine, crystallizing the salt of the mineral acid within the generator and withdrawing the crystals from the vessel.

In those reaction systems wherein the acid normality is maintained between about 2 and 4.8, the reaction may be carried out in the presence of a relatively small amount of a catalyst, such as those selected from the group consisting of vanadium pentoxide, silver ions, manganese ions, dichromate ions and arsenic ions.

As the reaction occurs within the generator in producing chlorine dioxide from sodium chlorate and sodium chloride, where sulfuric acid is employed as a mineral acid reactant, crystals of sodium sulfate are crystallized and withdrawn in the form of a slurry. The main reaction is shown by the formula $$NaClO_3 + NaCl + H_2SO_4 \rightarrow ClO_2 + \tfrac{1}{2}Cl_2 + Na_2SO_4 + H_2O \tag{3}$$

Sodium sulfate is a valuable by-product useful in kraft pulping operation. It is used in the chemical recovery system in order to cover losses of sulfur and sodium.

In some cases, however, the requirement for sodium sulfate is greatly reduced or obviated. In certain kraft mill operations, the requirements for sodium sulfate may be reduced or varied. While the requirement for reduced quantities of sodium sulfate may vary, the requirement for the chlorine dioxide remains or even increases.

In order to reduce the quantities of sodium sulfate it has been suggested in U.S. Pat. No. 3,933,987 to substitute part of the sodium chloride with hydrochloric acid as a source for the reducing agent. Here, the hydrochloric acid serves the dual function as a reducing agent and as a portion of the mineral acid. By using the combination of sulfuric acid and hydrochloric acid the amount of precipitated sodium sulfate can be effectively controlled and reduced. When one mole of hydrochloric acid and half a mole of sulfuric acid are used, the amount of precipitated sodium sulfate is reduced by 50% compared to the mode when all chloride ions are added as sodium chloride, as can be seen by comparing formula (3) with the following formula:

$$NaClO_3 + HCl + \tfrac{1}{2}H_2SO_4 \rightarrow ClO_2 + \tfrac{1}{2}Cl_2 + \tfrac{1}{2}Na_2SO_4 + H_2O \tag{4}$$

The main reactions for the chlorine dioxide production always also produce half a mole of chlorine per mole of chlorine dioxide, see formulas (1), (3) and (4). An additional small amount of chlorine is also produced by the side reaction according to formula (2). This chlorine product has formerly been used as such in the paper mills as a bleaching agent in aqueous solution, or it has been reacted with sodium hydroxide to form sodium hypochlorite and used as a bleaching agent. Today there is a tendency towards a more extensive chlorine dioxide bleaching and thus a decreasing need for chlorine and hypochlorite as bleaching agents. Another disadvantage with by-product chlorine is that the concentration of the chlorine solution is very low, normally 1–5 g/l. Because of the large amount of water, modern bleaching systems cannot use the by-product chlorine in the chlorination stage. This means that many pulp mills consider the chlorine as a by-product of limited value.

In order to make the chlorine dioxide process more attractive, it has been suggested that the amount of chlorine leaving the plant can be reduced by reacting the by-product chlorine with sulfur dioxide and producing a mixture of sulfuric acid and hydronchloric acid according to the formula $$Cl_2 + SO_2 + 2H_2O \rightarrow 2HCl + H_2SO_4 \tag{5}$$

The produced mixed acid can thereafter be used directly as acid feed to the chlorine dioxide reactor operating in a partial hydrochloric acid mode according to formula (4).

Such processes have been previously described in U.S. Pat. No. 3,347,628 and Swedish published patent application No. 8103892. In U.S. Pat. No. 4,086,329 a balanced process is described, where just sufficient sulfuric acid is produced according to formula (5) in order to get the exact need of sulfate ions to be combined with the sodium ions introduced to the chlorine dioxide generating system with the sodium chlorate.

The reaction of sulfur dioxide and chlorine obtained in the chlorine dioxide generating process is also disclosed in U.S. Pat. No. 4,393,036. Here the reaction is effected in an aqueous medium at a temperature below the boiling point of water. In order to accomplish this, the reaction is carried out in a cooled falling film tower having integral cooling passages or in a packed bed tower with a substantial portion of the produced mixed acid being recycled through an external heat exchanger. This patent shows the difficulties in controlling the exothermic reaction of chlorine and sulfur dioxide.

Another difficulty in returning the mixed acid produced by reacting by-product chlorine with sulfur dioxide, is that the mixed acid normally contains unreacted sulfur dioxide which might be detrimental to the chlorine dioxide reaction when the mixed acid is recycled to the reactor. Sulphur dioxide is a reducing agent which can interact with the chloride ion as reducing agent in the reaction and thus leads to imbalance in the reaction and to a decrease in efficiency. It has also been observed that sulfur dioxide dissolved in the mixed acid forwarded to the chlorine dioxide reactor might have a detrimental effect on the morphology of the sodium sulfate crystals precipitated in the process. This is due to the reducing effect of sulfur dioxide on dichromate ions. The dichromate ions can be present in the cell liquor from a chlorate cell, which cell liquor is used as the source of sodium chlorate feed to the reactor. These dichromate ions are reduced to trivalent chromium which causes the sodium sulfate to precipitate as very fine crystals which might be difficult to separate from the reaction medium. In order to avoid sulfur dioxide in the acid solution, it is suggested in the U.S. Pat. No. 4,393,036 to effect the reaction of chlorine and sulfur dioxide in a great excess of chlorine.

SUMMARY OF INVENTION

The present invention presents another solution of the problem of re-introducing into a chlorine dioxide reactor a mixed acid produced by reacting by-product chlorine from the reactor with sulfur dioxide. According to the invented process a mixed acid is produced which contains no or neglible amounts of dissolved sulfur dioxide.

According to the present invention a mixture of sulfuric acid and hydrochloric acid essentially free from dissolved sulfur dioxide to be used in a chlorine dioxide reactor is produced by reacting chlorine, including at least the chlorine obtained after the chlorine dioxide absorption step, and sulfur dioxide in at least two reaction zones. In the bottom of the primary reaction zone the total amount of sulfur dioxide needed for the mixed acid production is introduced in an aqueous mixture of sulfuric and hydochloric acid containing dissolved chlorine and gaseous chlorine. The sulfur dioxide reacts with chlorine in the aqueous phase to produce sulfuric acid and hydrochloric acid, thereby increasing the acid strength of the reaction medium. The mixed acid produced in the primary reaction zone contains dissolved quantities of sulfur dioxide and is forwarded to the secondary reaction zone. Chlorine is introduced into the lower part of the secondary reaction zone, and preferably in the bottom of this zone. The amount introduced can be the total amount of chlorine to be used in the production of the mixed acid for the chlorine dioxide reactor, or it can be a part of that amount, the balance being introduced in the primary reaction zone. The amount should be large enough for a gaseous chlorine phase to leave the secondary reaction zone. The produced mixed acid is withdrawn from the lower part, and preferably the bottom of the secondary reaction zone. At least a part of the mixed acid is introduced into the chlorine dioxide reactor.

GENERAL DESCRIPTION OF THE INVENTION

It has been found according to the invention that the content of sulfur dioxide in the mixed acid can be effectively controlled and reduced by the use of the secondary reaction zone, where a portion of the unreacted sulfur dioxide dissolved in the mixed acid from the primary reaction zone is reacted with the chlorine fed into this zone. The chlorine is rapidly dissolved in the mixed acid and the reaction takes place in the aqueous phase. It has also been found that the chlorine introduced into the secondary reaction zone has another beneficial effect on the sulfur dioxide content of the mixed acid from the primary reaction zone. Gaseous chlorine, and air contained therein, causes the dissolved sulfur dioxide to be physicochemically desorbed from the mixed acid. The reactions in the secondary reaction zone can thus be represented by the following formulas:

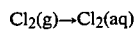

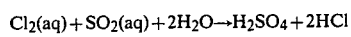

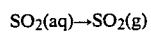

At least a portion of the mixed acid from the secondary reaction zone is fed to the chlorine dioxide reactor. The sulfur dioxide desorbed from the mixed acid in the secondary reaction zone is mixed with the chlorine gas and fed to the primary reaction zone where it reacts to form hydrochloric acid and sulfuric acid. The reaction between sulfur dioxide and chlorine takes place predominantly in the aqueous phase, and, as far as the gases are dissolved in this during their transport from the secondary reaction zone to the primary reaction zone they react to from hydrochloric acid and sulfuric acid.

In order to ensure that all residual sulfuric dioxide in the mixed acid is stripped off it is necessary to charge chlorine to the secondary reaction zone in such an amount that gaseous chlorine leaves the secondary reaction zone.

Although the liquid and gaseous phases are brought into contact countercurrently in both the primary and secondary reaction zones, the net transport of chlorine and sulfur dioxide is cocurrent from the gaseous phase to the liquid phase in the primary reaction zone and countercurrent in the secondary reaction zone in which chlorine moves from the vapour phase to the liquid phase and sulfur dioxide moves from the liquid phase to the vapour phase.

It is thus evident that all of the products formed in the secondary reaction zone are efficiently utilized in the present process. The economy of the total chlorine dioxide process is improved since the efficiency of chlorine utilization is increased and there is no need for large chlorine excesses, as suggested in prior art, in order to obtain a mixed acid for the chlorine dioxide process which is free from or essentially free from dissolved sulfur dioxide.

According to one embodiment of the invention the primary reaction zone and secondary reaction zone are contained in one vessel. The mixed acid flows downward in the vessel and is withdrawn at the bottom of the vessel. At least a portion of the chlorine is introduced in the bottom or lowest part of the vessel. The chlorine is added in such an amount that it leaves the secondary reaction zone as a gaseous phase and preferably constitutes a continuous phase in the secondary reaction zone.

The minimum height of the secondary reaction zone (H) is determined by the number of transfer units (N) and the height of each transfer unit required for reaction of the amount of chlorine which stoichiometrically corresponds to the desired reduction of the residual sulfur dioxide which is not desorbed from the mixed acid. This can be calculated in a known manner and depends on the type of reaction vessel, the gas flows and the flow rate and strength of the mixed acid as well as the temperature of the mixed acid.

The sulfur dioxide inlet in a single vessel reactor is situated immediately above the secondary reaction zone. If further chlorine is added to the primary reaction zone it is suitable to add it here. The sulfur dioxide is thus introduced in the bottom of the primary reaction zone and sulfur dioxide and at least chlorine from the secondary reaction zone are dissolved in the aqueous mixed acid phase, where the reaction to hydrochloric acid and sulfuric acid takes place, thus increasing the strength of the mixed acid. In the same way as in the secondary reaction zone the height of the primary reaction zone is determined depending of the type of reactor, the gas flows and flow rate, temperature and strength of the mixed acid.

The mixed acid withdrawn from the lower part of the vessel is normally divided into two portions. One is brought to the reaction zone for chlorine dioxide production and one is reintroduced in the upper part of the vessel for mixed acid production. The ratio of the portions should normally be within 1:5 to 1:50, preferably within 1:10 to 1:30 and especially 1:15 to 1:25. The ratio is determined by the desired temperature and concentration profiles in the reactor. With high recirculation the temperature and the liquid concentration is levelled out and the liquid load is high. This influences the conditions for the absorption and for mass transport. Water is also introduced into the vessel, and preferably in the upper part or at the top of the vessel, in an amount to balance the water which is consumed in the reaction of sulfur dioxide and chlorine and which is brought to the chlorine dioxide reactor in the mixed acid solution. It is preferred to add fresh water to the top of the vessel separate from the mixed acid inlet, as the addition of water supresses the equilibrium vapour pressures, so that losses of chlorine, hydrogen chloride and sulfur dioxide with the exhausts are reduced to a minimum.

The strength of the mixed acid produced is determined by the extent of recirculation of acid solution and the flow rate of the added water, chlorine and sulfur dioxide. As the mixed acid should be reintroduced into the chlorine dioxide reactor, wherein water is evaporated from the reaction medium in order to keep a constant volume in the reactor, too weak acid solution must be avoided. A suitable acid normality of the sulfuric and hydrochloric acid is within the interval of 6 to 14 and preferably of 8 to 13.

The mixed acid leaving the vessel should normally be cooled in order to remove the heat of reaction, unless the vessel is equipped with internal cooling means. The cooling is preferably accomplished by passing the mixed acid through an external heat exchanger. The cooling can be effected on the total stream of mixed acid, but is preferably effected on the portion which is recirculated to the vessel. By doing so, the mixed acid introduced to the chlorine dioxide reactor also adds heat to the reaction solution, and the need of heating this diminishes.

Normally the amount of mixed acid produced according to the invention corresponds to the amount obtained by reacting the by-product chlorine from the chlorine dioxide process which is obtained from the chloride dioxide absorption step. It is, however, also possible to add further chlorine to the mixed acid production process. Preferably any additional chlorine is added to the stream of chlorine coming from the chlorine dioxide absorption step. In some cases it may be advantageous to add external chlorine either to the primary reaction zone or to the secondary reaction zone. Chlorine can be added to both the primary reaction zone and secondary reaction zone, but for practical purposes it is suitable to add all chlorine only to the secondary reaction zone. The chlorine from the chlorine dioxide absorption step may contain air or inert gases from the chlorine dioxide reaction, such as nitrogen, which also can be introduced into the vessel. This flow of inert gases improves the above mentioned desorption of the sulfur dioxide from the secondary reaction zone.

The sulfur dioxide used in the process can be contained in the sulfur containing gases from a pulp mill, and thus constitute a part of the sulfur dioxide feed. Such sulfur containing effluent also contains minor amounts of hydrogen sulfide and organic sulfurous compounds which in normal amounts do not seem to affect the mixed acid adversely.

Preferably the vessel for the production of mixed acid is equipped with a tail gas reactor. In such case, sulfur dioxide and chlorine not reacted in the vessel are brought to the tail gas reactor or tail tower. Here cold water is added which is especially advantageous since the gas-liquid equilibria for chlorine, hydrochloric acid and sulfur dioxide are strongly temperature dependent and the corresponding equilibrium constants $$K_{Cl_2} = [Cl_2(g)]/[Cl_2(aq)]$$

$$K_{HCl} = [HCl(g)]/[HVl(aq)]$$

$$K_{SO_2} = [SO_2(g)]/[SO_2(aq)]$$

decrease with decreasing temperature.

The equilibrium constants are also dependent on the acidity and ion strength of the aqueous phase in a complex way. Since chlorine and sulfur dioxide equilibrium constants decrease with increasing hydrochloric acid strength in the range of concentration of mixed acid normally produced, but increase with increasing sulfuric acid strength and the hydrochloric acid equilibrium constant increases with acidity it has been found advantageous to keep the acidity low by addition of water in the upper part of the tail tower.

The vessel for the reaction between sulfur dioxide and chlorine, should be of the type permitting good contact between liquid and gaseous phases. As examples of suitable reactors can be mentioned packed bed towers, sieve bottom or tray towers, falling film absorbers, spray or bubble reactors, intensive mixers, static mixers or stirred tank reactors. The reaction is exothermic and therefore the reactors are preferably equipped with suitable external or internal cooling means, so that the aqueous phase is kept below the boiling point of the mixed acid. The boiling point of 12 N mixed acid containing 17.5% hydrochloric acid and 23.5% sulfuric acid is 108° to 109° C. Normally the temperature is kept below 10° C. of the boiling point, suitably below 95° C. and preferably below 80° C. The temperature can normally be kept above 30° C. and preferably above 40° C. A preferred reactor is a packed bed tower.

The reaction normally takes place at ambient pressures, however, moderately sub or super atmospheric pressures can be used. In order to ensure that the mixed acid leaving the secondary reaction zone does not contain deletrious amounts of sulfur dioxide, the acid can be subjected to a continuous analysis of sulfur dioxide and chlorine. The analyser gives a signal to a regulator for the chlorine feed to the secondary reaction zone. In order to get satisfactory results with respect to crystallization of sodium sulfate in the presence of dicromate ions in the chlorine dioxide reactor, the amount of dissolved sulfur dioxide in the mixed acid should not exceed 0.1 percent by weight and most preferably not exceed 0.05 percent by weight.

According to another embodiment of the present invention, the primary reaction zone and secondary reaction zone are divided into two separate vessels. Chlorine is fed to the bottom of the vessel for the secondary reaction, i.e. the reaction of chlorine with the produced mixed acid containing dissolved sulfur dioxide. A portion of the mixed acid produced in the primary reaction zone is fed to the upper part or top of the vessel for the secondary reaction zone and is withdrawn from the bottom and directly forwarded to the chlorine dioxide reactor. The chlorine is added in excess in order to leave the vessel as a gaseous phase together with gaseous sulfur dioxide which is desorbed from the mixed acid. The gas stream is introduced in the lower part or bottom of the vessel in which the primary reaction takes place, i.e. the reaction between charged sulfur dioxide and chlorine.

Chlorine can be added to both the primary reaction zone and secondary reaction zone but it is also possible to add all chlorine only to the secondary reaction zone. The amount of chlorine added to the secondary reaction zone should be within 2-100% of the total chlorine feed.

By separating the primary reaction zone and secondary reaction zone some advantages can be obtained. The secondary reaction has only to be carried out on the portion of mixed acid which should be brought to the chlorine dioxide reactor. This portion is considerably smaller than the total amount of mixed acid to be stripped when the secondary reaction zone is situated in the same vessel as the primary reaction zone, as the predominant portion of acid is recirculated. The reaction in the secondary reaction zone is less exothermic, as the amount of sulfur dioxide is considerably lower in comparison to the primary reaction zone, and this means that the vessel can have a more simple design and no or simple means for cooling.

The vessel for the primary reaction in this embodiment can be of the same type as for the embodiment where only one vessel is used for both the primary and secondary reactions. The only difference is that when only the primary reaction takes place in a vessel there is no need for a separate, and lower, inlet for chlorine. This means that the size of the vessel decreases, which may be advantageous as the primary reaction is very exothermic and expensive materials are thus required for the construction. The mixed acid produced is divided into two portions in the same manner as for the single vessel. The main portion is recirculated to the upper part of the vessel and the other portion of the mixed acid is brought to the vessel for the secondary reaction. Both portions can be cooled, or at least the recirculated portion of mixed acid should be cooled before it is brought to the primary reaction zone.

BRIEF DESCRIPTION OF THE DRAWINGS

The invention is further explained with reference to the accompanying drawings, where.

DESCRIPTION OF PREFERRED EMBODIMENTS

Figure 1:
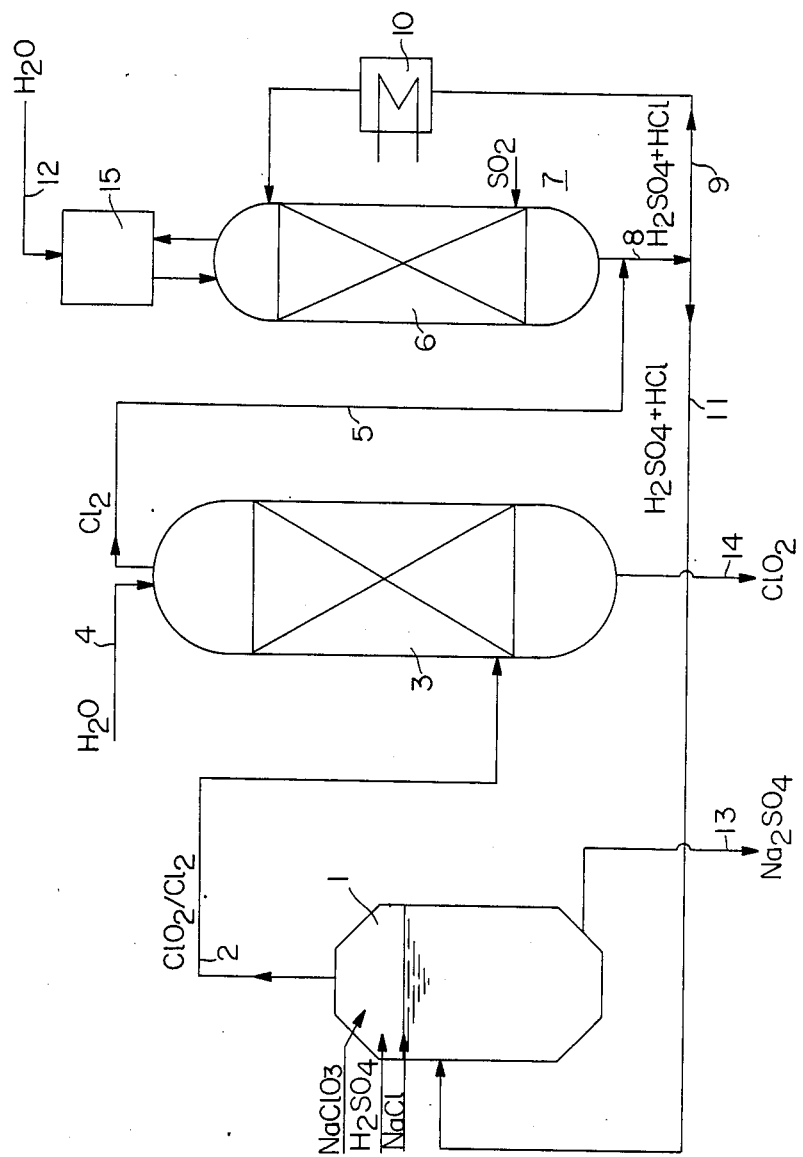
FIG. 1 is a schematic flow sheet of one embodiment of the invention using a packed tower with external cooling as a single reactor for the primary and secondary reaction.

In FIG. 1 the chlorine dioxide is generated continuously in a chlorine dioxide generator 1. The reactants are fed as aqueous solutions of sodium chlorate, sodium chloride, sulfuric acid and hydrochloric acid. The solution is maintained at the desired generator temperature by heating.

The generator is operated at a pressure of about 100-400 mm Hg. The heating and pressure is adjusted in the generator in order to volatilize sufficient water to maintain the liquid level substantially constant by removing water of reaction and the excess water fed with the chlorate, chloride and acid solutions. Thus the temperature used can be from 30°-90° C. and preferably from 40°-85° C. The evaporative load on the reaction medium usually is such as to produce a weight ratio of steam to chlorine dioxide from about 4:1 to about 10:1. The steam removed with the chlorine dioxide and chlorine is sufficient to dilute the chlorine dioxide to a safe concentration thereby eliminating the danger of explosion. The acid normality of the reaction medium is kept within the interval of about 2 to about 4.8 and is adjusted by incorporation of mixed acid produced in the reactor 6 and introduced in line 11 and by adding fresh acid, preferably sulfuric acid, in order to maintain the acidity in the generator solution. Precipitated sodium sulfate is removed from the reactor by line 13.

The generated gaseous mixture of chlorine dioxide and chlorine withdrawn from the reactor 1 in the steam of evaporated water, usually after cooling (not shown), is forwarded by line 2 to a chlorine dioxide absorption tower 3 to which water is added by line 4 to dissolve the chlorine dioxide. Aqueous chlorine dioxide product, also containing dissolved chlorine, is withdrawn from the system at 14.

The residual chlorine is forwarded by line 5 to the bottom of reactor 6 which is a packed bed tower. The tower contains mixed acid solution which is descending the tower by gravity. Some chlorine is dissolved in the mixed acid solution and reacts in this secondary reaction zone with residual sulfur dioxide in the solution. Sulphur dioxide is introduced in line 7 at the bottom of the primary reaction zone. The reaction of sulfuric acid and hydrochloric acid is exothermic and the acid solution must be cooled. This is accomplished by withdrawing the acid solution at the bottom of reactor in line 8 and dividing the acid stream in two portions. One is re-introduced into the chlorine dioxide reactor 1 by line 11. The rest is brought by line 9 to a heat exchanger 10 for cooling and is recirculated to the top of the reactor 6. Fresh water is added to the top of tail tower 15 by line 12 in order to compensate for the water consumed in the reactions and the water reintroduced as mixed acid into the chlorine dioxide generator.

Figure 2:
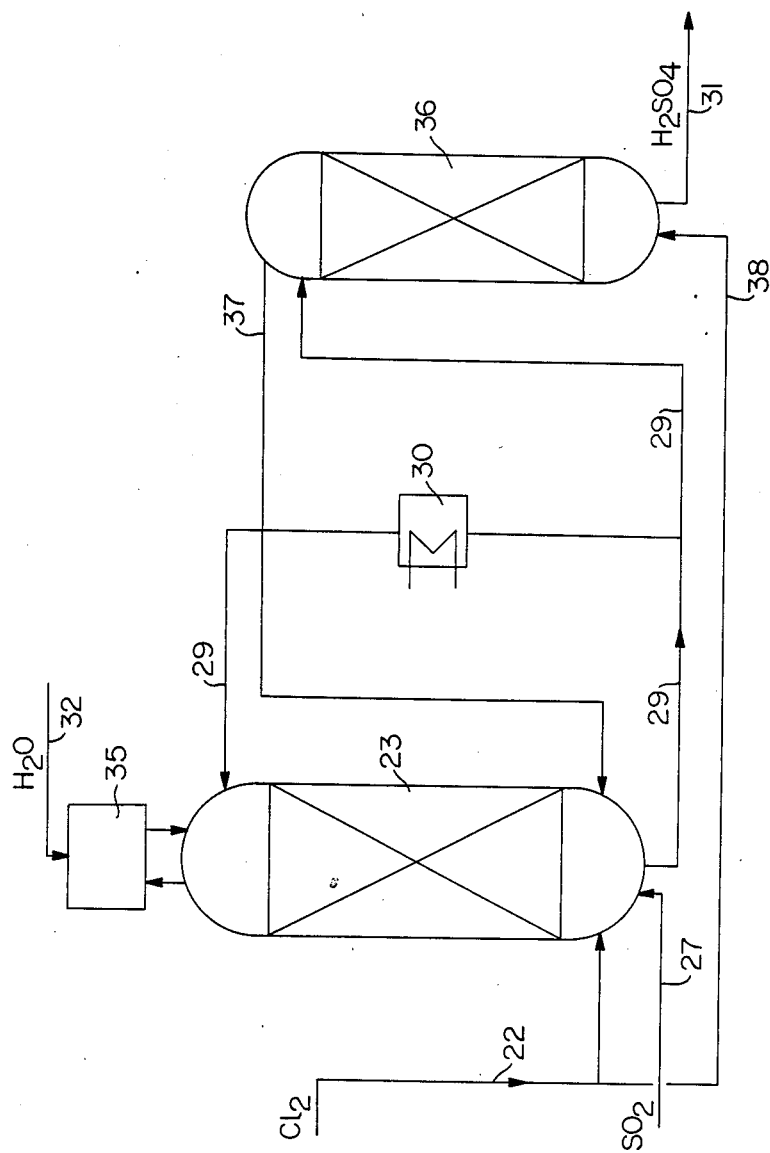
FIG. 2 is a schematic flow sheet of the embodiment where the primary and secondary reactions are carried out in separate vessels.

FIG. 2 shows the embodiment where the primary reaction zone and secondary reaction zone are contained in two different vessels. Chlorine from the chlorine dioxide absorption tower (not shown) is introduced by line 22 into the bottom of a packed bed tower 23 together with sulfur dioxide at line 27. The gases dissolve in the mixed acid stream descending the tower and react in this primary reaction zone to form hydrochloric acid and sulfuric acid. The mixed acid is withdrawn by line 29 and divided into two portions. The major portion is cooled in a heat exchanger 30 and reintroduced by line 29 to the top of the tower 23. Water is added by line 32 to tail gas tower 35 in which gaseous reaction products from the primary reaction zone are absorbed and returned to the tower 23 as mixed acid.

The remaining portion of mixed acid produced in the tower 23 and containing dissolved residual sulfur dioxide is forwarded by line 29' to the secondary reaction zone which is a packed bed tower 36. The acid is introduced in the top of the tower and flows by gravity through the tower. Gaseous chlorine from the chlorine dioxide absorption tower is introduced in the bottom of the tower 36 by line 38. The chlorine dissolves in the mixed acid in the secondary reaction zone 36 and reacts with the residual quantities of sulfur dioxide. The chlorine introduced also causes dissolved sulfur dioxide to be stripped off from the aqueous phase and the gaseous mixture leaves the tower 36 by line 37 and is reintroduced into the primary reaction zone. The mixed acid leaving the secondary reaction zone by line 31 and having a reduced content of sulfur dioxide is brought to the chlorine dioxide reactor (not shown).

The invention is further described in the following examples, where parts and percentages are parts by weight and percentage per weight, unless otherwise defined.

EXAMPLE 1

This example illustrates the effect of $SO_2$ in the mixed acid in the chlorine dioxide production. A laboratory chlorine dioxide generator was run with the production rate 90 g/min $ClO_2$ at a temperature of 78° C. and at a pressure of 235 mm Hg absolute. A solution with 550 g/l $NaClO_3$ containing 4.2 g/l $Na_2Cr_2O_7$ and 97.8 g/l NaCl was fed to the generator. The balance of the chloride consumed in the reaction was fed as mixed acid with a total acid normality of 12 N containing 17.5% hydrochloric acid and 23.5% sulfuric acid. Sulphuric acid was also fed to the generator. A gas mixture of chlorine dioxide, chlorine and water vapour was continuously removed from the generator. Anhydrous sodium sulfate was removed from the system by filtration of part of the generator solution which was recycled to the generator. The steady state concentrations in the generator were 1.1 M $NaClO_3$, 1.1 M NaCl, 6 g/l $Na_2Cr_2O_7$, total acid normality 3.5 N and the volume of the crystal fraction was 10%.

A series of experiments were carried out with different amounts of sulfur dioxide in the mixed acid. The crystal size was determined, and as can be seen from Table I the crystal size decreases with increasing content sulfur dioxide in the mixed acid. At an amount of 0.4% sulfur dioxide in the mixed acid only 24.8% of the sodium sulfate crystals have a particle size above 100 µm. Although this crystal size cannot be compared to the crystal size in a full scale chlorine dioxide generator, it is quite clear that 0.4% sulfur dioxide in the mixed acid reduce the crystal size to such a degree that it is in practice impossible to use such mixed acid in the chlorine dioxide generator. When the mixed acid contains 0.1% sulfur dioxide the crystal size is well within what can be accepted when the process is transferred to a full scale generator. According to the invention, therefore, the content sulfur dioxide in the mixed acid should be below 0.1% and most preferably below 0.05%.

TABLE I

| Crystals, staying on sieve µm | Mixed acid, sulfur dioxide content % | | | |
|---|---|---|---|---|
| | 0 | 0.05 | 0.1 | 0.4 |
| >315 | 0.3 | 0.2 | 0 | 0 |
| 250 | 1.1 | 0.9 | 0.5 | 0.3 |
| 200 | 4.2 | 3.1 | 2.5 | 0.8 |
| 160 | 14.1 | 12.0 | 9.0 | 1.7 |
| 100 | 57.7 | 56.8 | 52.1 | 24.8 |
| 63 | 84.4 | 83.6 | 82.2 | 80.6 |

EXAMPLE 2

A laboratory equipment according to FIG. 1 was set up for the production of a mixed acid with hydrochloric acid and sulfuric acid from chlorine, sulfur dioxide and water. The reactor 6 and the tail tower 15 were packed bed towers. From the bottom of the secondary reaction zone a portion of the stream was taken out to an end product tank passing a redox analyzer controlling the content of dissolved $SO_2$ in the mixed acid. The produced mixed acid had a temperature of 55° C. The redox potential was higher than 440 mV (SCE). The remainder of the mixed acid withdrawn from the bottom of the reactor, 93%, was recycled to the top of the reactor passing a heat exchanger 10, where part of the heat of reaction was removed so that the temperature at the top of the reactor 6 was 50° C. In the bottom of the reactor 6, i.e. in the bottom of the secondary reaction zone a mixture of chlorine and air, with 2.8 g chlorine/g air was introduced. Sulphur dioxide was introduced in the bottom of the primary reaction zone, which in this equipment and under the prevailing conditions was calculated to be at a height of 22% of the total height of the reactor 6.

The portion of the mixed acid that was recycled in line 9 was mixed in the top of the reactor with an aqueous stream from the tail gas tower 15. In the top of the tail gas tower the water needed for the process was introduced in 12 having a temperature of less than 20° C. Part of the reaction takes place in the tail tower which is indicated by the fact that there is a temperature rise in the lower parts of the tail tower. The process was run at approximately atmospheric pressure and the produced mixed acid was used in the chlorine dioxide generating process mentioned in Example I.

Under steady state conditions 12 N mixed acid was produced having a content of 17.5% hydrochloric acid, 23.5% sulfuric acid and 0.03% dissolved sulfur dioxide.

For 100 g mixed acid produced was charged to the reactor 17.1 g chlorine and 15.45 g sulfur dioxide. To the tail gas tower was charged 67.8 g water.

A similar experiment with the same equipment was carried out with the exception that the sulfur dioxide was introduced in the bottom of the reactor. The produced mixed acid contained 0.5% sulfur dioxide. As can be seen from Table I this amount of sulfur dioxide would negatively affect the crystal size of the sodium sulfate precipitated in a chloride dioxide generator if the mixed acid was used for chlorine dioxide production.

EXAMPLE 3

This example illustrates another embodiment of the invention in which a process equipment according to FIG. 2 was used. In this experiment a portion 29' of the mixed acid 29 from a packed tower 23, i.e. a primary reaction zone, was taken out and introduced in the top of a second reactor 36. i.e. a secondary reaction zone. The total acid normality in this stream was 11.7 N, the content of sulfur dioxide was 0.6% and the temperature was 55° C. In the bottom of the reactor 36 was introduced a gas stream 38 which was 10% of the gas stream 22. The gas stream 38 contained chlorine and air with 2.8 g chlorine per gram air. The gas stream 38 was countercurrently contacted with a part of the mixed acid from the primary reaction zone and part of the dissolved sulfur dioxide was reacted with chlorine to form hydrogen chloride and sulfuric acid. The rest of the sulfur dioxide was desorbed and from the top of the reactor a gas stream 37 containing chlorine, sulfur dioxide, air and water vapour was withdrawn and introduced in the bottom of the reactor 23, i.e. the first reaction zone. From the bottom of the second reaction zone a stream was taken out to a product tank passing a redox analyzer controlling the content of dissolved $SO_2$ in the mixed acid. The produced mixed acid has a total acid normality 12 N and a content of 17.5% hydrochloric acid, 23.5% sulfuric acid and 0.03% sulfur dioxide. The temperature was approximately 55° C. and the redox potential was higher than 440 mV (SCE).

The remainder (92%) of the mixed acid withdrawn from the reactor 23 was recycled to the top of this reaction zone passing a heat exchanger 30, where part of the heat of reaction was removed so that the temperature in the top of this reaction zone was 50° C. In the bottom of the first reaction zone a gas stream 27 was introduced containing sulfur dioxide. Together with this a gas stream containing chlorine and air was introduced. The stream was 90% of a gas stream 22 containing chlorine in equimolar amount with the sulfur dioxide. The conditions in the top of the first reactor and in the tail gas tower are essentially the same as in example 1.

We claim:

1. A process for production of chlorine dioxide which comprises:
   (a) reacting in a chlorine dioxide generator sodium chlorate with chloride ions and sulfuric acid in an acid normality of about 2 to about 4.8 normal, said chloride ions being provided by hydrochloric acid or by a mixture of hydrochloric acid and sodium chloride, in proportions to generate chlorine dioxide;
   (b) maintaining said reaction medium at a temperature from about 50° C. to about 100° C.;
   (c) subjecting the reaction solution to a subatmospheric pressure sufficient to effect evaporation of water;
   (d) precipitating sodium sulfate from the reaction medium and removing it from the reaction zone;
   (e) withdrawing a mixture of chlorine dioxide, chlorine and water vapour and forming an aqueous solution of the chlorine dioxide and a gaseous chlorine stream therefrom;
   (f) forwarding said chlorine to a production zone for hydrochloric acid and sulfuric acid comprising a primary reaction zone and a secondary reaction zone;
   (g) introducing sulfur dioxide and chlorine into the lower part of the primary reaction zone in contact with a fluid stream which contains hydrochloric acid and sulfuric acid, at least a portion of said chlorine coming from the secondary reaction zone, whereby said sulfur dioxide reacts with the chlorine in said primary reaction zone to form a fluid mixture of hydrochloric acid and sulfuric acid containing residual sulfur dioxide;
   (h) forwarding said fluid mixture of acids, which contains residual sulfur dioxide, from said primary reaction zone, to the secondary reaction zone and introducing chlorine, in an amount sufficient for gaseous chlorine to leave said secondary reaction zone and in an amount exceeding that which stoichiometrically corresponds to the reduction of the sulfur dioxide content in the mixed acid, into the lower part of said secondary reaction zone downstream of the sulfur dioxide feed stream in the primary reaction zone and in contact with said fluid mixture, the chlorine reacting with the sulfur dioxide and thereby reducing the sulfur dioxide content in the mixture of acids flowing through said secondary reaction zone, the chlorine and the sulfur dioxide being introduced into the production zone in substantially stoichiometrically equal amounts; and
   (i) forwarding at least part of the mixture of acids passing through said secondary reaction zone to the chlorine dioxide generator, and withdrawing gaseous chlorine from the top of the secondary reaction zone and passing it to the lower portion of the primary reaction zone.

2. A process according to claim 1, wherein the primary and secondary reaction zones for the reaction of chlorine and sulfur dioxide are contained in a single vessel.

3. A process according to claim 1, wherein substantially only the chlorine produced in the reaction zone is introduced into the production zone.

4. A process according to claim 1 wherein chlorine in addition to the chlorine coming from the secondary reaction zone is introduced at the bottom of the primary reaction zone.

5. A process according to claim 1, wherein a portion of the mixed acid withdrawn from the secondary reaction zone is forwarded to the chlorine dioxide generator and the remainder is recirculated to the upper part of the primary reaction zone.

6. A process according to claim 1, wherein the primary and secondary reaction zones are contained in separate vessels.

7. A process according to claim 1, wherein at least part of the total chlorine is introduced into the secondary reaction zone in an amount sufficient for gaseous chlorine to leave the secondary reaction zone and in an amount exceeding that which stoichiometrically corresponds to the desired reduction of the sulfur dioxide content of the mixed acid and wherein the gaseous products from the secondary reaction zone are introduced into the lower part of the primary reaction zone together with the remainder of the chlorine.

8. A process according to claim 6 wherein a portion of the mixed acid withdrawn from the primary reaction zone is forwarded to the secondary reaction zone and the remainder is recirculated to the upper part of the primary reaction zone.

9. A process according to claim 7 wherein the mixed acid withdrawn from the secondary reaction zone is forwarded to the chloride dioxide generator.

10. A process for production of chlorine dioxide which comprises:
 (a) reacting in a chlorine dioxide generator sodium chlorate with chloride ions and sulfuric acid in an acid normality of about 2 to about 4.8 normal, said chloride ions being provided by hydrochloric acid or by a mixture of hydrochloric acid and sodium chloride, in proportions to generate chlorine dioxide;
 (b) maintaining said reaction medium at a temperature from about 50° C. to about 100° C.;
 (c) subjecting the reaction solution to a subatmospheric pressure sufficient to effect evaporation of water;
 (d) precipitating sodium sulfate from the reaction medium and removing it from the reaction zone;
 (e) withdrawing a mixture of chlorine dioxide, chlorine and water vapour from the reaction zone and forming an aqueous solution of the chlorine dioxide and a gaseous chlorine stream therefrom;
 (f) forwarding said chlorine to a production zone for hydrochloric acid and sulfuric acid comprising a primary reaction zone and a secondary reaction zone;
 (g) introducing sulfur dioxide and chlorine into the lower part of the primary reaction zone in contact with a fluid stream containing hydrochloric acid and sulfuric acid, at least a portion of said chlorine coming from the secondary reaction zone and the remainder of said chlorine coming from step (e), said sulfur dioxide and chlorine reacting in said primary reaction zone to form a fluid mixture of hydrochloric acid and sulfuric acid containing residual sulfur dioxide;
 (h) forwarding said fluid mixture of acids formed in step (g), and which contain residual sulfur dioxide, to the secondary reaction zone and introducing chlorine, in an amount sufficient for gaseous chlorine to leave said secondary reaction zone and in an amount exceeding that which stoichiometrically corresponds to the reduction of the sulfur dioxide content in the mixed acid, into the lower part of said secondary reaction zone downstream of the sulfur dioxide feed stream in the primary reaction zone and in contact with said fluid mixture, a portion of the thus introduced chlorine reacting with sulfur dioxide to thereby reduce the sulfur dioxide content of the fluid mixture flowing through said secondary reaction zone, the chlorine and the sulfur dioxide being introduced into the production zone in substantially stoichiometrically equal amounts; and
 (i) forwarding at least part of the mixture of acids passing through said secondary reaction zone to the chlorine dioxide generator, and withdrawing gaseous chlorine from the top of the secondary reaction zone and passing it to the lower portion of the primary reaction zone.

* * * * *